D. A. Woodward,
Camera.
Nº 16,700.                    Patented Feb. 24, 1857.
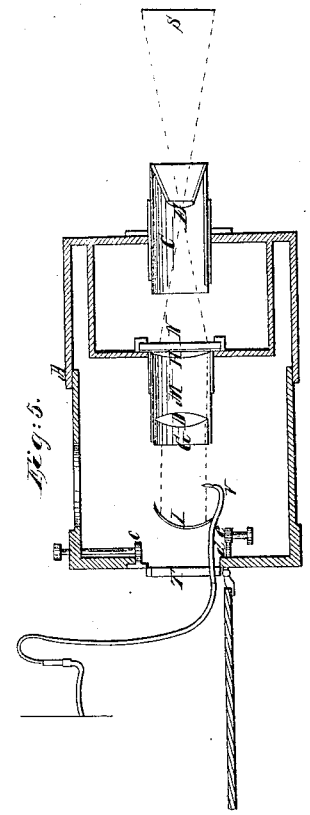
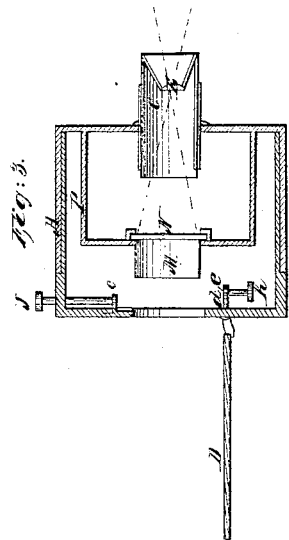
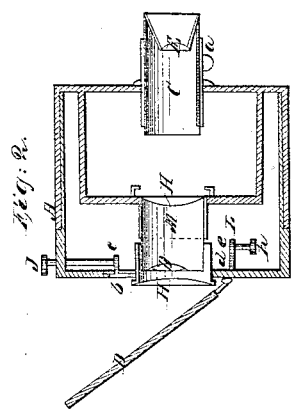
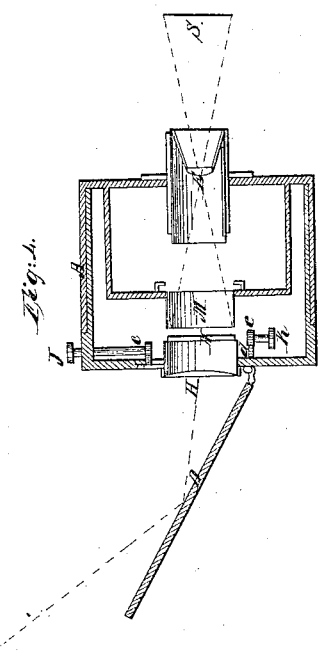
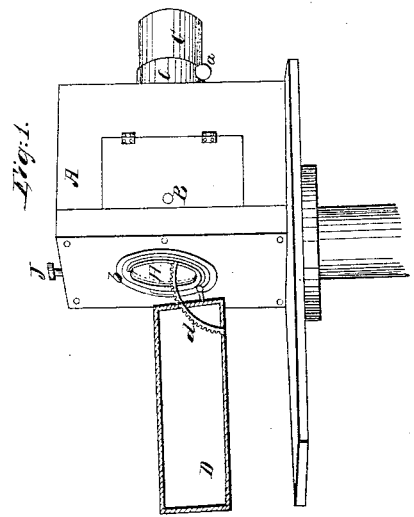

UNITED STATES PATENT OFFICE.

DAVID A. WOODWARD, OF BALTIMORE, MARYLAND.

SOLAR CAMERA.

Specification of Letters Patent No. 16,700, dated February 24, 1857.

*To all whom it may concern:*

Be it known that I, DAVID A. WOODWARD, of the city of Baltimore and State of Maryland, have invented a new and useful Instrument, which I call a " Solar Camera," of which the following is a full, clear, and exact description, reference being had to the accompanying drawing, through letters of reference marked thereon, forming part of this specification, and in which—

Figure 1 represents a perspective view of my instrument; Fig. 2 a vertical longitudinal section of the same. Fig. 3 represents a similar section, as used for photographing, and constitutes the common camera obscura, and Fig. 4 shows the instrument, as used for throwing the object (to be traced or painted) on a canvas, or other suitable material by transmitted light from the sun. Fig. 5 represents a sectional view of the instrument as used for the last named purposes, by transmitting artificial light.

The object of my invention is, first, to furnish the artist or draftsman with an instrument by which he may be enabled to produce an accurate image of the object to be delineated, by photography, and that will afterward portray on his canvas or other material, an infallible representation thereof in light and shade, whereby a most accurate likeness or copy of any desired size, may be produced, requiring only one sitting of the subject; and secondly to enable the photographic artist, to print a picture on prepared canvas or other material of greater or less dimensions than those of the negative ordinarily used for such purpose, whereby he is enabled to use a more perfect negative, produced by bringing the entire field of his picture within the focus of his instrument, and afterward throwing it up, and printing by concentrating the rays of light through the instrument, instead of placing his negative in close contact with the prepared paper, as in the usual way.

To enable others skilled in the art to make and use my invention, I will now proceed to describe its construction and operation.

(A) represents the box of an ordinary camera obscura, constructed with a slide for the purpose of focusing (when used for throwing the picture on a distant object, which will be hereinafter described,) and is fitted with a sliding tube (*c*) holding an achromatic lens, which is focused by means of a rack and pinion (*a*); within the box (A) is a dark chamber (P), fitted with slides to receive the sheath (N) in which the glass or other plate, on which the picture is to be taken is supported, thus forming a complete and perfect camera obscura, by which, the negative picture on glass is first produced, which is afterward copied in a similar manner, by placing it between the instrument and the light, to produce a picture on glass that is positive when seen by transmitted light; this part of the process being completed, I transform the " camera obscura " into a new instrument, which I call the " solar camera " by adapting to it a luminating lens (H) and reflector (D) Fig. 4, similar to those used in the solar microscope; for the luminating lens I will use a planoconvex one, fitted in the rear end of the camera box, on a line with the achromatic lens (E), in rear of this, I attach a mirror or reflector (D), supported on a circular collar (*b*) encompassing the lens (H), on the inner side of this collar is a rack, with a pinion (*c*) gearing into it, which is operated by the mill-head (S).

To one side of the reflector is attached a segmental rack (*d*), which passes through by the side of the lens (H) and gears with the pinion (*c*), which is operated by the mill-head (K), by which, together with the pinion (*c*) gearing into the circular rack, the reflector is brought to any necessary position, to receive the sun's rays and focus them on the lens; this being done, the positive picture (N), before mentioned, is placed at a convenient distance in front of the luminating lens (H), when the rays of light passing through it and the achromatic lens (E), throw the picture on the canvas at (S), which may be arranged and focused to any desired size, to be traced or painted; for this purpose it is not necessary to darken the room, but merely to exclude the direct rays of the sun.

In using this instrument to print photographic pictures on chemically prepared paper or canvas, the negative picture is just taken on glass, as before described by the camera obscura, which is then placed in its position at (N), when the sun's rays passing through it, are concentrated by the lens on the prepared paper at (S), which, as in the former case, may be focused so as to produce a picture of any desired size, taken from the smallest negative.

To adapt the instrument to be used by artificial light, I arrange it as represented in Fig. 5, placing the positive or negative picture, (as the case may be,) in the grooves which receive the sheath at (N), with a cylindrical sliding tube (M) containing the luminating lens (H) immediately in rear of the picture, and a condensing lens (D) in rear of that, with a concave mirror (I) near the rear end of the box, between which and the lens (D) the light is introduced; the aperture occupied by the luminating lens (H) in Fig. 4, being closed or darkened, the picture will then be thrown on the canvas at (S), as in the former case.

It will be perfectly obvious that this instrument may be so arranged and constructed, as to throw the picture downward onto a table, or in any position most convenient for the artist to work.

Having thus described my invention what I claim as new, and desire to secure by Letters Patent, is:

I do not claim the photographing camera obscura or the solar reflector and lens or any part thereof of themselves, but,

I claim—

Adapting to the camera obscura a lens and reflector in rear of the object glass in such manner that it is made to answer the two fold purpose of a camera obscura and camera lucida substantially as and for the purposes specified.

In testimony thereof I hereunto sign my name this 13th day of December 1856.

D. A. WOODWARD.

Witnesses:
J. C. FOERTSCH,
WM. MORRIS SMITH.